United States Patent

Parkinson

[11] Patent Number: 5,997,072
[45] Date of Patent: Dec. 7, 1999

[54] SLIDE-OVER REAR DOOR FOR AUTOMOTIVE APPLICATIONS

[75] Inventor: David Parkinson, Spirit Lake, Iowa

[73] Assignee: Raven Industries, Sioux Falls, S. Dak.

[21] Appl. No.: 09/019,003

[22] Filed: Feb. 5, 1998

Related U.S. Application Data

[60] Provisional application No. 60/037,431, Feb. 7, 1997.
[51] Int. Cl.⁶ ....................................................... B60J 5/12
[52] U.S. Cl. ........................... 296/146.8; 296/56; 296/164
[58] Field of Search ................................. 296/202, 146.8, 296/163, 164, 201, 56, 106

[56] References Cited

U.S. PATENT DOCUMENTS

| 4,620,743 | 11/1986 | Eke ...................................... | 296/146.8 |
| 4,801,174 | 1/1989 | Hirshberg et al. .................. | 296/106 X |

FOREIGN PATENT DOCUMENTS

| 2696704 | 4/1994 | France .................................. | 296/146.8 |
| 2703005 | 9/1994 | France .................................. | 296/146.8 |

OTHER PUBLICATIONS

Glasstite product brochure "The Ultimate Truck Cap". (No Date).

*Primary Examiner*—D. Glenn Dayoan
*Assistant Examiner*—Jason Morrow
*Attorney, Agent, or Firm*—Hill & Simpson

[57] ABSTRACT

An all glass slide-over rear door for vehicle and camper shells is provided. The all glass door is pivotally attached to the roof of the vehicle with two hinges that are slidably accommodated in a pair of parallel tracks mounted to the roof of the shell or vehicle. Two gas props connect an inside surface of the door to the opposing sides of the rear opening. The gas props are pivotally connected to the inside surface of the door and each prop is further connected to a bracket mounted on one of the opposing sides of the rear opening by way of an offset link. The offset link provides lateral clearance between the prop and the side of the rear opening and further lowers the overall height of the rear door when the rear door is in the fully open position.

20 Claims, 6 Drawing Sheets

SLIDE-OVER REAR DOOR FOR AUTOMOTIVE APPLICATIONS

This application was previously filed as a provisional application Serial No. 60/037,431 on Feb. 7, 1997.

FIELD OF THE INVENTION

The present invention relates generally to rear doors for automobiles. More specifically, the present invention relates to rear doors for a cap or shell mounted over a bed for a pickup truck. Still more specifically, the present invention relates to an all glass rear door that is pivotally and slidably attached to a vehicle so that the door slides up and over the roof of the vehicle when in a fully open position.

BACKGROUND OF THE INVENTION

Light trucks such as pickup trucks and station wagons have incorporated an all glass rear door which includes hinges disposed at the top of the door for pivotal upward movement. During normal driving conditions, these rear doors are typically in the closed position. When open, the doors extend outward from the junction of the rear opening of the vehicle and the roof of the vehicle. As a result, the door can get in the way when loading cargo into the back of the vehicle. Specifically, the position of the hinges and the connection of the top edge of the door to the roof presents a restriction to the rear opening of the vehicle. As a result, large items such as all terrain vehicles, motorcycles and bicycles cannot be easily loaded due to the height restriction.

In order to overcome the disadvantages of rear doors that are merely pivotally connected to the roof of the vehicle at an upper edge of the door as discussed above, the so-called "slide-over" rear doors were developed. A slide-over rear door does not include a fixed hinged connection between the top edge of the door and the rear portion of the roof of the vehicle. Instead, the roof typically includes a pair of parallel tracks which slidably accommodate a protruding hinge member disposed along an upper edge of the door. Gas props are used at opposing sides of the rear opening to assist in the pivotal outward movement of the door. Once the door has been pivoted outward, it is slid backwards as the protruding members of the hinges slide towards the front of the vehicle in the tracks.

While the slide-over rear door is an improvement over the rear doors that include a simple hinge connection disposed along the top edge of the rear door, slide-over rear doors have not been provided for all glass rear doors. Specifically, slide-over rear doors have been limited to those doors which include a central panel made of the see-through glass or plexiglass mounted within a solid or opaque outer frame. The gas props are connected between the outer frame and the vehicle or shell. The incorporation of an outer frame has been deemed necessary because of the lack of appropriate sliding hinge connection between an all glass rear door and the available track configurations. Further, there has been a lack of appropriate connection mechanism between the gas props and an all glass rear door.

Yet another disadvantage with slide-over rear doors in general is the distance between the rear door and the roof of the vehicle when the door is in the fully open position. Specifically, in currently available designs, there is a space of several inches between the door and the roof of the vehicle or cap when the door is in the fully-open position. This wasted several inches has proven to be very inconvenient for shorter consumers who have great difficulty in reaching upward and grabbing the door before pulling the door down to the fully closed position.

Hence, there is a need for a slide-over rear door with an improved design that enables all glass rear doors to be utilized with a slide-over connection further which limits the amount of space or clearance between the door and the roof of the cap, shell or vehicle when the door is in the fully open position.

SUMMARY OF THE INVENTION

The present invention satisfies the aforenoted needs by providing a rear door assembly for pivotally and slidably attaching an all glass rear door to the rear end and to the roof of the vehicle. The assembly of the present invention includes a pair of parallel tracks mounted to the roof of the vehicle adjacent to, but disposed inwardly from, opposing sides of the rear opening of the vehicle. Each track slidably accommodates a hinge member that is pivotally connected to an upper edge of the door. A pair of gas props are attached to opposing sides of the door, adjacent to opposing sides of the rear opening. One end of each prop is attached to the door, an opposing end of each prop is attached to an offset link.

When the door is in the fully closed position, the door covers the rear opening. The hinges connecting the upper edge of the door to the parallel tracks are disposed at the frontmost portion of the tracks. The end of the gas props that are connected to the opposing sides of the door are disposed below the ends of the gas props that are connected to the offset links. The first ends of the offset links, which are connected to the vehicle at opposing sides of the rear opening, are disposed below the second ends of the offset links, each of which is connected to a gas prop.

To open the door, the user pulls the door outward, preferably using a handle, and rolls the door upward and forward in the direction of the front of the vehicle as the hinges slide along the track. In the fully open position, the second end of the offset link, i.e. the end connected to the gas prop, is disposed below the first end of the offset link, i.e. the end connected to the vehicle by way of a bracket.

The offset link enables the end of the gas prop that is connected to the offset link to drop vertically downward as the rear door is opened. This net downward vertical movement of the end of the gas prop that is connected to the offset link lowers the overall height of the rear door when the door is in the fully open position. Thus, the offset link provides the rear door with a lower vertical disposition in the fully open position.

The offset link also provides lateral inward clearance for the gas props which must be mounted along one of the opposing sides of the rear opening. In the past, the gas props were mounted to an exterior side of the vehicle disposed outwardly from the rear opening. Because prior art slide over rear doors include a solid outer frame, the gas props were hidden by the opaque frame when the door was in a closed position. However, when utilizing an all glass rear door, it is an aesthetically superior design to place the gas props inside of the rear opening so that they are less noticeable to the consumer when the all glass rear door is in the closed position. However, when the connecting bracket is mounted along an inside surface of the vehicle or cap, lateral clearance is necessary in order for the gas props to be able to pivot upward and downward without engaging the sides of the rear opening. The offset links provide this needed lateral clearance.

The offset links include two opposing ends which are disposed in generally parallel planes laterally spaced from one another. The links include a middle connecting portion that extends laterally between the first and second opposing ends. The laterally extending middle portion of the offset links provides the lateral clearance necessary for the proper operation of the gas props.

In an embodiment, the parallel tracks have a c-shaped cross section and each hinge connecting the upper edge of the door to the tracks includes a t-shaped protruding member which is slidably accommodated in the tracks.

In an embodiment, the t-shaped protruding member is fabricated from a plastic material, such as glass filled nylon.

In an embodiment, the tracks are fabricated from aluminum.

In an embodiment, each offset link is pivotally connected to a bracket mounted to an inside surface of the cap, shell or vehicle.

In an embodiment, each prop is pivotally connected to the door by way of a bracket mounted onto the door.

The present invention also provides an improved method of manufacturing truck caps or shells. The method comprises the steps of providing a shell, the shell comprising a rear opening having two opposing sides and a roof. The method further includes the step of providing a see-through rear door for covering the rear opening. To fabricate a truck cap in accordance with the present invention, a pair of tracks are attached to the roof in a generally parallel fashion to one another and generally parallel to but disposed inward from the opposing sides of the rear opening. A pair of hinges are attached to an upper edge of the door. Each hinge is attached to the door so that it is generally in alignment with the tracks attached to the roof of the shell. Each hinge further comprises a protruding member to be accommodated in one of the tracks. The protruding members of the hinges are inserted into the parallel tracks. A pair of brackets are attached to the shell at opposing sides of the rear opening. Offset links as described above are attached to each bracket. The offset links are connected to the gas props which are also then connected to the door at a place on an inside surface of the door below where the hinges are connected to an upper edge of the door.

It is therefore an object of the present invention to provide an all glass rear door for vehicles and caps, camper shells or toppers for vehicles such as pickups.

Another object of the present invention is to provide an improved slide-over rear door for vehicles, camper shells, caps and toppers.

Still another object of the present invention is to provide an all glass slide-over rear door for vehicles, caps, camper shells and toppers.

Yet another object of the present invention is to provide an improved slide over rear door that is easier to use than currently available slide-over rear doors.

Other objects and advantages of the present invention will become apparent upon reading the following detailed description and appended claims, and upon reference to the accompanying drawings.

BRIEF DESCRIPTION OF THE DRAWINGS

For a more complete understanding of the present invention, reference should now be made to the embodiments illustrated in greater detail in the accompanying drawings and described below by way of an example of the present invention.

In the drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
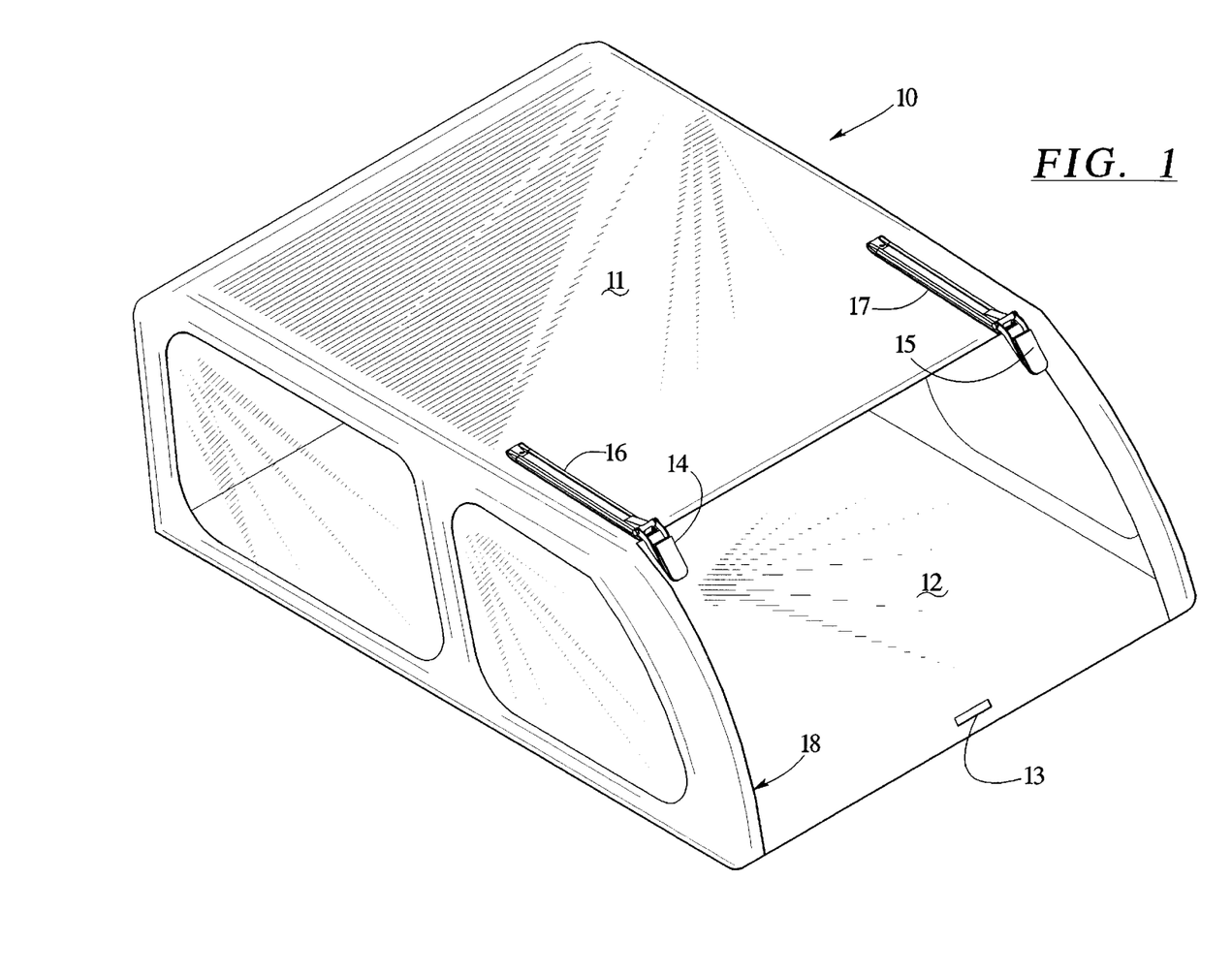
FIG. 1 is a perspective view of a slide-over rear door made in accordance with the present invention in a fully closed position.

Turning first to FIG. 1, a top portion 10 of a vehicle is shown which includes a roof 11 and a rear door 12 which, as discussed below, is both pivotally and slidably attached to the roof 11. The top portion 10 of the vehicle may be the upper portion of a car or a small van or may be a cap or shell that is mounted onto a pickup truck. Further, the top portion 10 may also represent the rear portion of a station wagon. The rear door 12 includes a handle 13 and two hinges 14, 15 which are slidably attached to two parallel tracks 16, 17. The rear door 12 covers a rear opening 18. In the preferred embodiment, the rear door 12 is fabricated from a unitary piece of plexi-glass and therefore is entirely see-through. For purposes of clarity, the portion of the vehicle shown at 10 will hereinafter be referred to as a shell 10.

Figure 2:
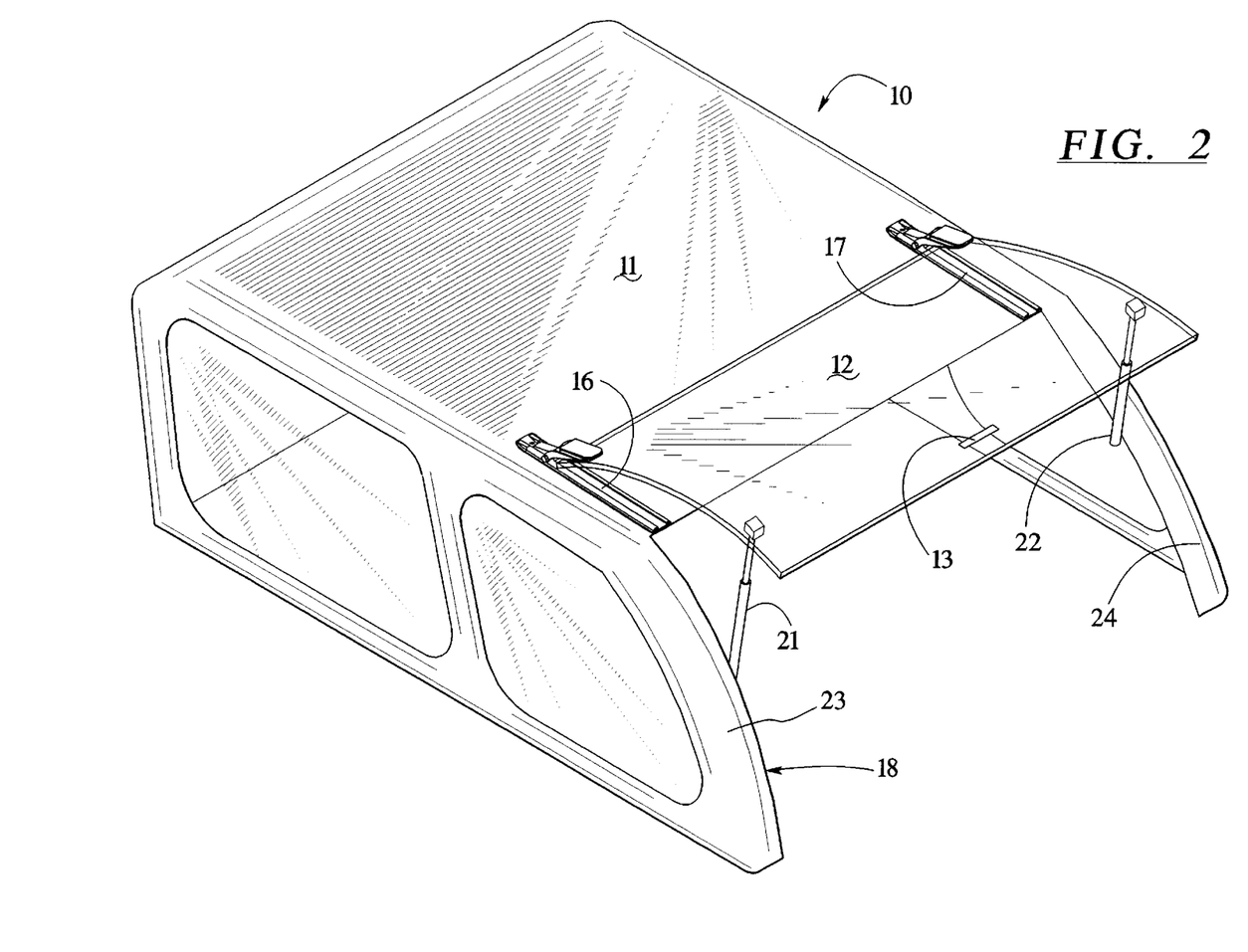
FIG. 2 is a perspective view of the slide-over rear door shown in FIG. 1 in the fully open position.

As shown in FIG. 2, the door may be opened by pulling upward on the handle 13 and pushing rearwardly so that the hinges 14, 15 slide in a forward direction, or toward the front of the vehicle, along the tracks 16, 17 respectively. The door 12 is also attached to the shell 10 by two gas props 21, 22. The gas props 21, 22 are attached to opposing sides 23, 24 respectively of the rear opening 18. The details of the connections between the gas props 21, 22 to the opposing sides 23, 24 of the shell 10 are discussed below in reference to FIGS. 4–6. The connections between the hinges 14, 15 and the tracks 16, 17 respectively are discussed below in reference to FIGS. 7–10.

Figure 3:
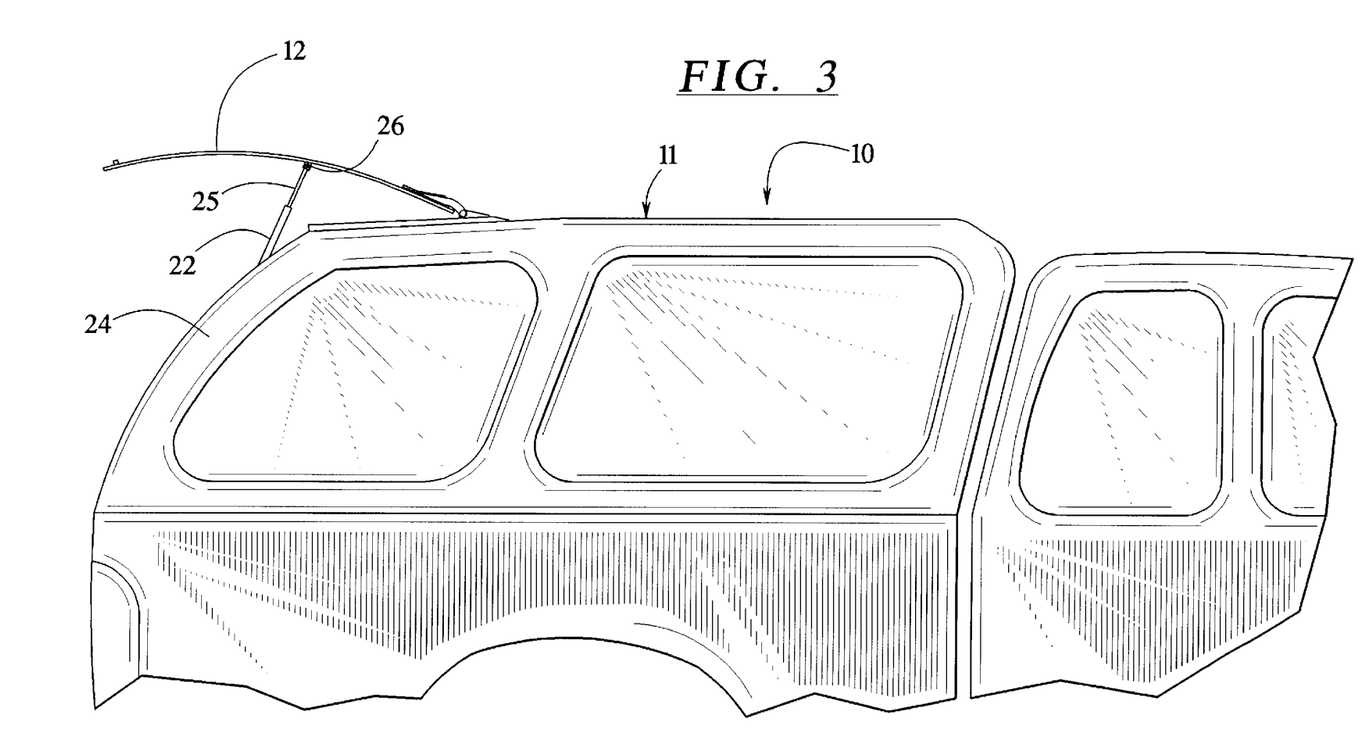
FIG. 3 is a side plan view of a slide-over rear door made in accordance with the present invention in a fully open position.

As indicated in FIG. 3, an extending arm 25 of the prop 22 is pivotally attached to the door 12 with a bracket 26. A corresponding bracket 27 which attaches an extending arm 28 of the prop 21 is illustrated in greater detail in FIG. 6. Specifically, the arm 28 is pivotally connected to an outwardly extending portion of the bracket 27 with a through bolt 29. Still referring to FIG. 6, the end 31 of the prop 21 is connected to the side 23 of the opening 18 by way of an offset link 32 and bracket 33. Specifically, the end 31 of the prop 21 is pivotally connected to the link 32 which, in turn, is pivotally connected to the bracket 33. The bracket 33 being fixedly attached to the side portion 23.

Figures 4, 5:
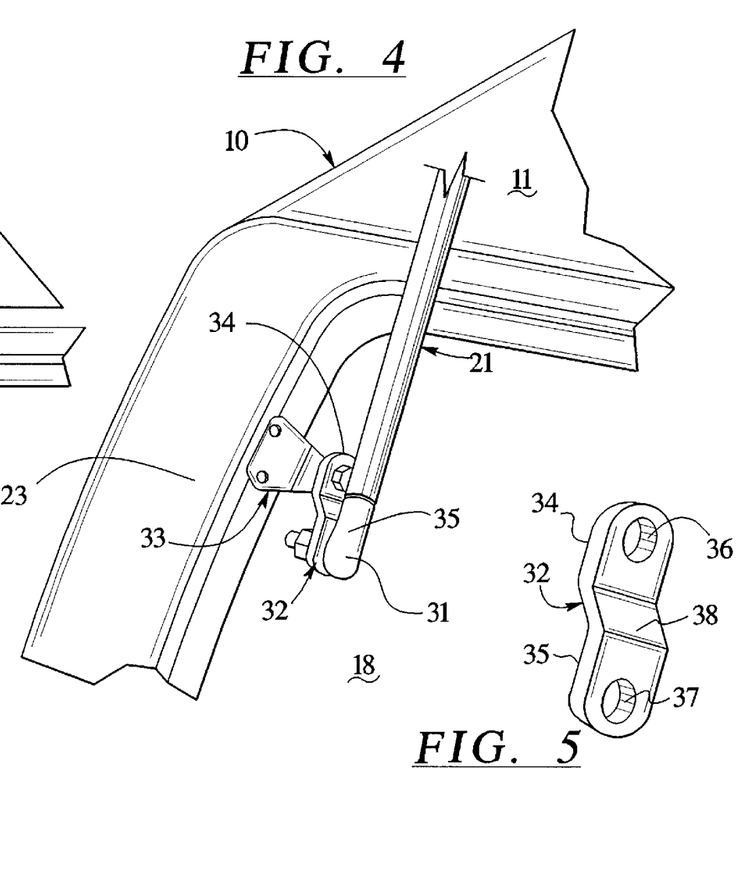
FIG. 4 is a partial view of a slide-over rear door made in accordance with the present invention in the fully open position.
FIG. 5 is a perspective view of an offset link made in accordance with the present invention.

Referring to FIGS. 4 and 5, the offset link 32 includes a first opposing end 34 and a second opposing end 35. Each end 34, 35 includes a through hole 36, 37 respectively for accommodating a through bolt or pin for pivotal attachment. The first end 34 of the link 32 is pivotally connected to the bracket 33 which is fixedly attached to the side 23 of the shell 10. The end 35 of the link 32 is pivotally connected to the end 31 of the prop 21. In the open position shown in FIGS. 4 and 6, the first end 34 of the link 32 is disposed above the second end 35 of the link 32. In contrast, in the closed position shown in FIG. 1, it will be appreciated that the prop 21 has pivoted downward so that the end 31 of the prop 21 and the second end 35 of the link 32 are disposed above the first end of the link 34. As a result, the offset link 32 lowers the overall height of the prop 21 and therefore the overall height of the door 12 when the door 12 is in the fully open position. Coupled with a corresponding link that attaches the prop 22 to the shell 10, the two offset links act to reduce the overall height of the door 12 in the fully open position. Accordingly, the employment of the offset links make it easier for a shorter person to reach upward and grab the handle 13 (see FIGS. 1 and 2) to close the door 12.

Figure 6:
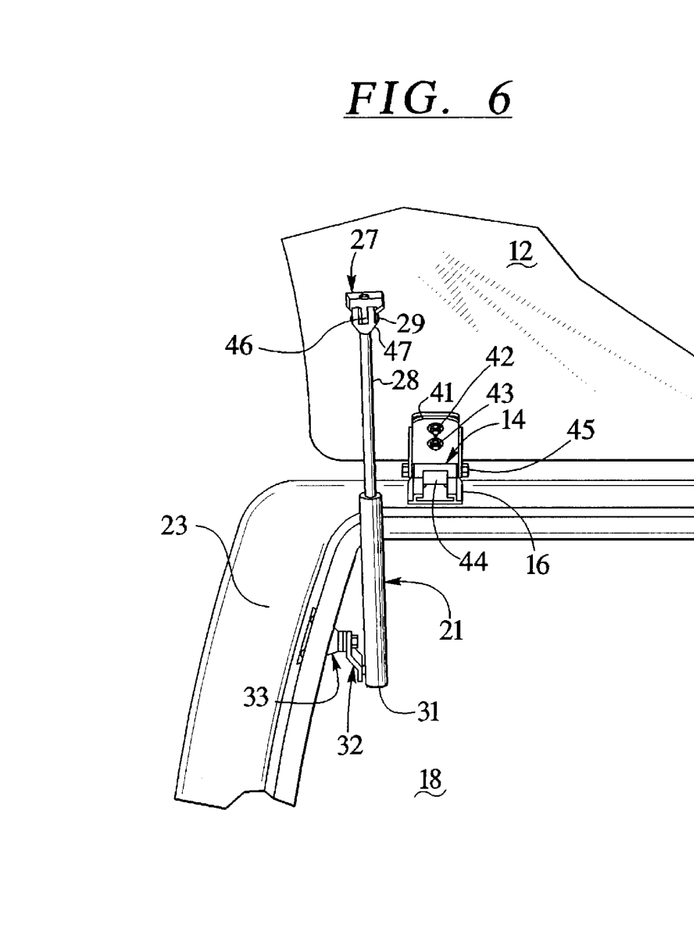
FIG. 6 is another partial view of a slide-over rear door made in accordance with the present invention in the fully open position.
Figures 7, 8:
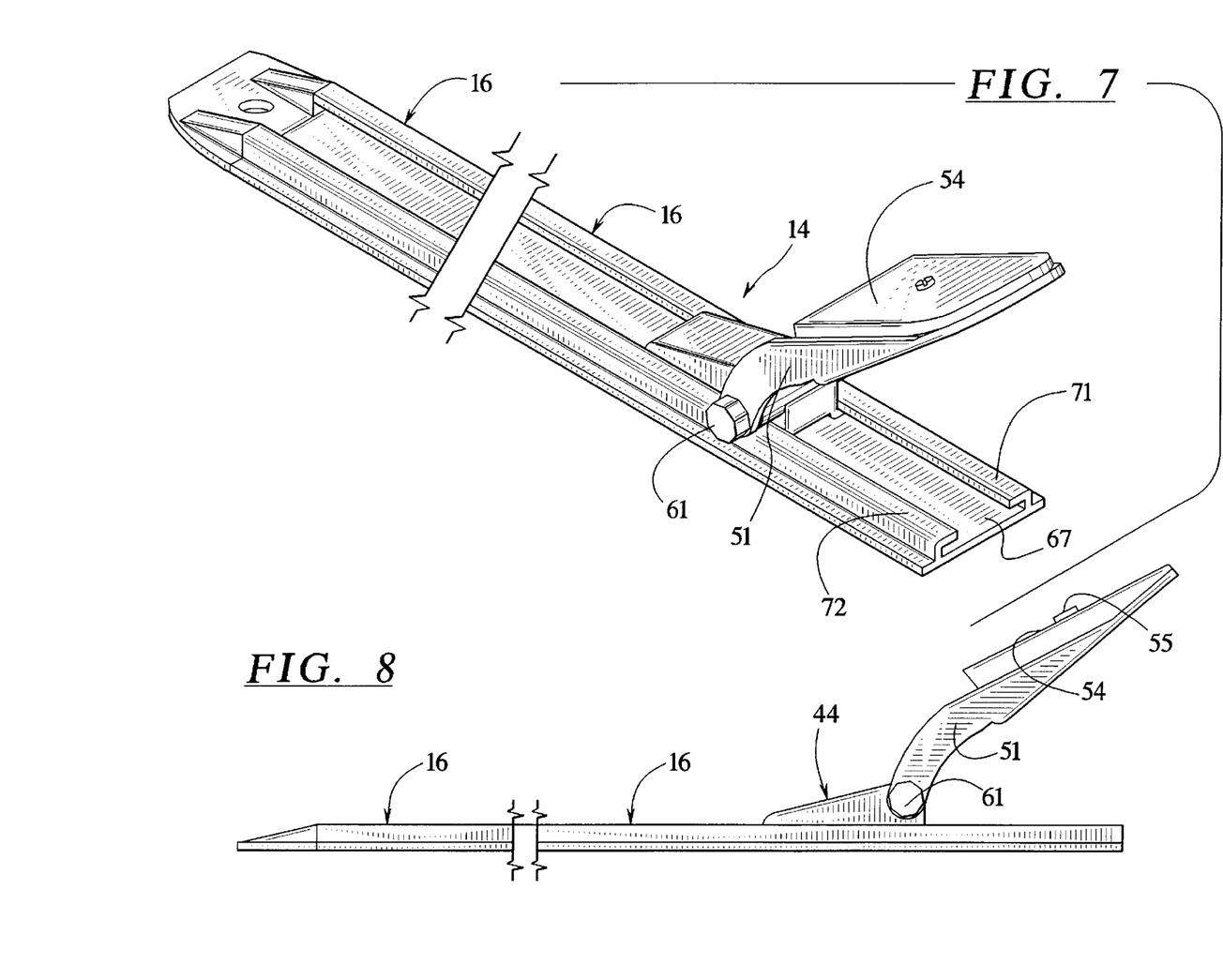
FIG. 7 is a perspective view of a track and hinge combination made in accordance with the present invention.
FIG. 8 is a side plan view of the track and hinge combination shown in FIG. 7.
Figure 9:
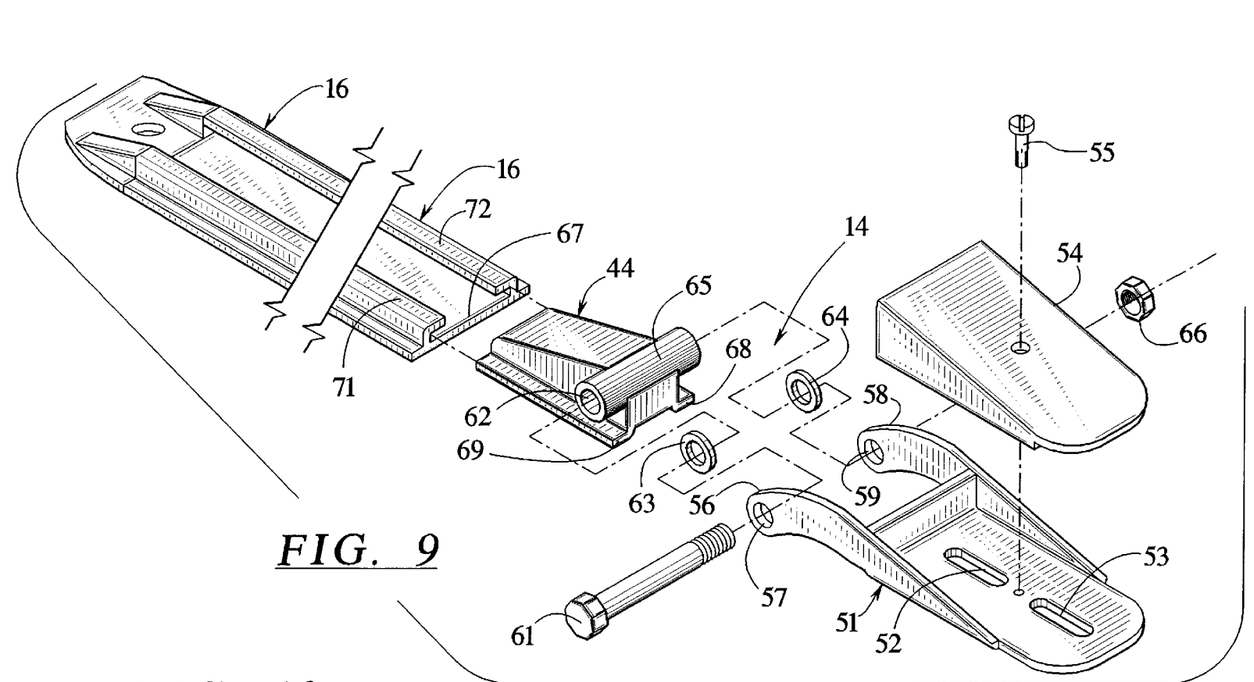
FIG. 9 is an exploded view of the track and hinge combination shown in FIG. 7.
Figure 10:
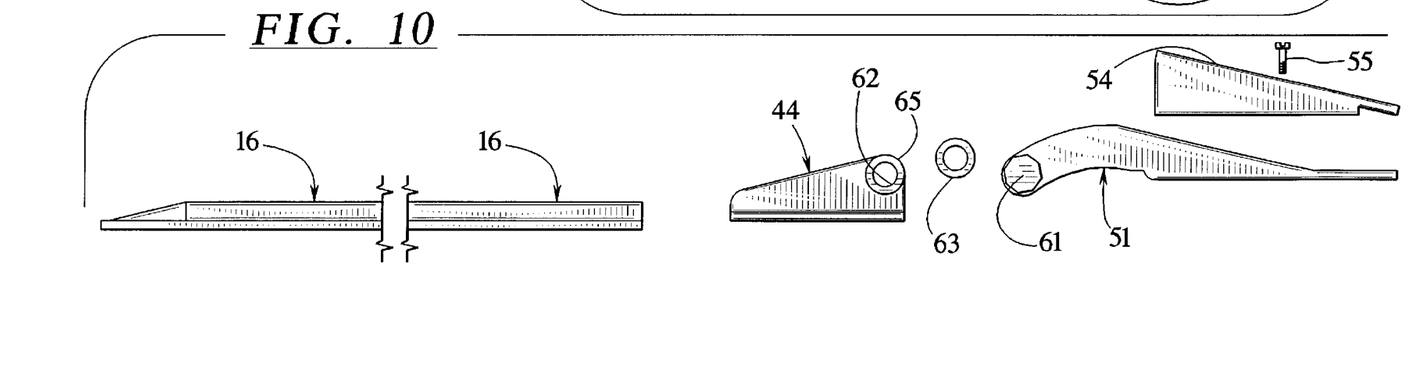
FIG. 10 is a side plan view of the track and hinge combination shown in FIG. 9.

In addition to reducing the height of the door 12 in the fully open position, the offset links also provide needed lateral spacing between the end 31 of the prop 21 and the side 23 of the shell 10. Specifically, as shown in FIGS. 4 and 6, the bracket 33 is mounted directly inside the opening 18. In order to provide for the pivotal movement of the prop 21, the end 31 of the prop 21 must be spaced outwardly, or to the right as shown in FIGS. 4 and 6, so that the end 31 of the prop 21 will not engage the side 23 of the opening 18. The needed lateral clearance is provided by the link 32 and, more specifically, by the central offset section 38 which is the structure that provides the needed lateral clearance.

Turning to FIG. 6, the hinge 14 is attached to the door 12 by way of a connecting bracket 41 which in turn is connected to the door 12 with two bolts 42, 43. The hinge 14 includes a t-shaped protruding member 44 that is accommodated in the c-shaped cross section of the track 16. The hinge 14 is pivotally connected to the bracket 41 by the through bolt 45. It will also be noted that the bracket 27 includes a clevis end 47 for accommodating the end 46 of the arm 28 which includes a projecting ear portion (not shown). The through bolt 29 passing through both sides of the clevis end 47 and the projection ear portion of the end 46 of the arm 28.

The connection between the hinge 14 and track 16 is further illustrated in FIGS. 7–10. Specifically, the hinge assembly 14 includes a base plate 51 that is attached to the door 12 by way of the bolts 42, 43 (see FIG. 6) that extend through the through holes 52, 53. A cover plate 54 is provided which effectively hides the bolts 42, 43 and provides a cleaner and more aesthetically pleasing exterior appearance. The plate 54 is attached to the base 51 with a screw 55. The base 51 includes a u-shaped or clevis end which includes two walls 56, 58 with corresponding through holes 57, 59 for accommodating a through bolt 61. The bolt 61 passes through the passageway 62 of the extending member 44. While the extending member 44 includes a t-shaped cross section, the extending member 44 extends forwardly to provide a smooth sliding engagement between the extending member 44 and the track 16. In a preferred embodiment, the extending member 44 is fabricated from glass filled nylon or another suitable polymer material to limit the amount of friction between the extending member 44 and the track 16, which is preferably fabricated from aluminum. Preferably, a pair of washers 64 are disposed between the inside surfaces of the walls 57, 58 and the link portion 65 of the extending member 44. The through bolt 61 is secured in place with the nut 66.

The track 16 features a flat bottom wall 67 for engaging the bottom surfaces of the rails 68, 69 of the extending member 44. The rail 16 also includes a pair of upwardly and inwardly extending lips 71, 72 for engaging the upper surfaces of the rails 68, 69 of the extending member.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A rear door assembly for pivotally and slidably attaching a rear door to a rear end and to a roof of a vehicle, the door covering a rear opening in the vehicle when the door is in a fully closed position, the door being disposed above the roof of the vehicle when the door is in a fully open position, the assembly comprising:

a pair of pair parallel tracks attached to the roof of the vehicle, each track slidably accommodating a hinge that is connected to an upper edge of the door, a pair of gas props connected to opposing sides of the door, each prop being connected to an offset link which is pivotally attached to the vehicle at an opposing side of the rear opening, each offset link comprising opposing first and second ends, the first end of each offset link being pivotally attached to the vehicle, the second end being pivotally attached to its respective prop, the first end being disposed vertically below the second end when the door is in the closed position, the first end being disposed above the second end when the door is in the open position.

2. The assembly of claim 1 wherein the door is fabricated from a see-through polymer material.

3. The assembly of claim 1 wherein the door is fabricated from plexi-glass.

4. The assembly of claim 1 wherein each track has a c-shaped cross section and each hinge comprises a protruding member with a t-shaped cross section that is slidably accommodated in the c-shaped cross section of its respective track.

5. The assembly of claim 1 wherein the first end of each offset link is pivotally connected to a bracket mounted onto the vehicle.

6. The assembly of claim 1 wherein an end of each prop is pivotally connected to a bracket mounted onto the door.

7. The assembly of claim 1 wherein each hinge is fabricated from a polymer material and each track is fabricated from aluminum.

8. The assembly of claim 1 wherein the first and second ends each offset link are disposed in substantially parallel and substantially vertical planes, each offset link further comprising a central offset section extending laterally between and connecting the first and second ends.

9. A vehicle comprising:

a rear door covering a rear opening when the rear door is in a fully closed position, the door being pivotally and slidably connected to a roof of the vehicle, the door being disposed above the roof of the vehicle when the door is in a fully open position, the roof comprising a pair of pair parallel tracks mounted to an outer surface thereof, each track slidably accommodating a hinge that is connected to an upper edge of the door, the door being connected to a pair of gas props disposed at opposing sides of the door, each prop connecting the door to an offset link, the offset links being pivotally attached to the vehicle at opposing sides of the rear opening, each offset link comprising opposing first and second ends, the first end of each offset link being pivotally attached to the vehicle, the second end being pivotally attached to its respective prop, the second end being disposed vertically above the first end when the door is in the closed position, the second end being disposed below the first end when the door is in the open position.

10. The vehicle of claim 9 wherein the door is fabricated from a see-through polymer material.

11. The vehicle of claim 9 wherein the door is fabricated from plexi-glass.

12. The vehicle of claim 9 wherein each track has a c-shaped cross section and each hinge comprises a protruding member having a t-shaped cross section that is slidably accommodated in the c-shaped cross section of its respective track.

13. The vehicle of claim 9 wherein the first end of each offset link is pivotally connected to a bracket mounted onto the vehicle.

14. The vehicle of claim 9 wherein an end of each prop is pivotally connected to a bracket mounted onto the door.

15. The vehicle of claim 9 wherein each hinge is fabricated from a polymer material and each track is fabricated from aluminum.

16. The vehicle of claim 9 wherein the first and second ends each offset link are disposed in substantially parallel and substantially vertical planes, each offset link further comprising a central offset section extending laterally between and connecting the first and second ends.

17. A cap for a pickup truck comprising:

a see-through rear door without a supporting outer frame, the door covering a rear opening when the rear door is in a fully closed position, the door being pivotally and slidably connected to a roof of the cap, the door being disposed above the roof when the door is in a fully open position, the roof being fixedly connected to a pair of pair parallel tracks, each track slidably accommodating a hinge that is connected to an upper edge of the door, the door being connected to a pair of gas props disposed at opposing sides of the door, each prop connecting the door to an offset link which is pivotally attached to the vehicle at opposing sides of the rear opening, each offset link comprising opposing first and second ends, the first end of each offset link being pivotally attached to the vehicle, the second end being pivotally attached to its respective prop, the second end being disposed vertically above the first end when the door is in the closed position, the second end being disposed below the first end when the door is in the open position.

18. The cap of claim 17 wherein each track has a c-shaped cross section and each hinge comprises a protruding member with a t-shaped cross section that is slidably accommodated in the c-shaped cross section of its respective track.

19. The cap of claim 17 wherein the first and second ends each offset link are disposed in substantially parallel and substantially vertical planes, each offset link further comprising a central offset section extending laterally between and connecting the first and second ends.

20. A method of manufacturing truck caps, the method comprising the following steps:

providing a shell, the shell comprising a rear opening having two opposing sides and a roof, providing a see-through rear door for covering the rear opening, attaching a pair of tracks to the roof generally parallel to one another and generally parallel to but disposed inward from the opposing sides of the rear opening, attaching a pair of hinges to an upper edge of the door, each hinge being aligned with one of said tracks and comprising a protruding member to be accommodated in one of said tracks, inserting a protruding member of each hinge into one of said tracks, attaching a pair of brackets to the shell at the opposing sides of rear opening, attaching an offset link to each bracket, each offset link comprising opposing first and second ends, the first end of each offset link being pivotally attached to one of said brackets, attaching the second end of each link to one end of a gas prop, attaching an other end of each gas prop to the door at opposing sides thereof and below and in general alignment with a hinge.

* * * * *